Aug. 23, 1932.  R. K. LEE  1,872,766
MOTOR MOUNTING
Filed Feb. 24, 1930
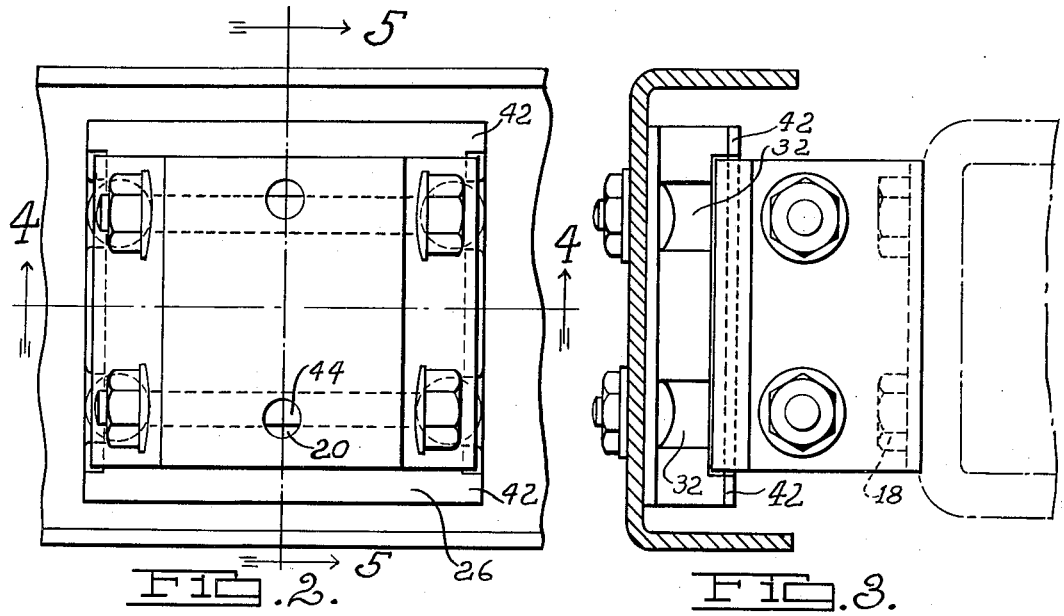
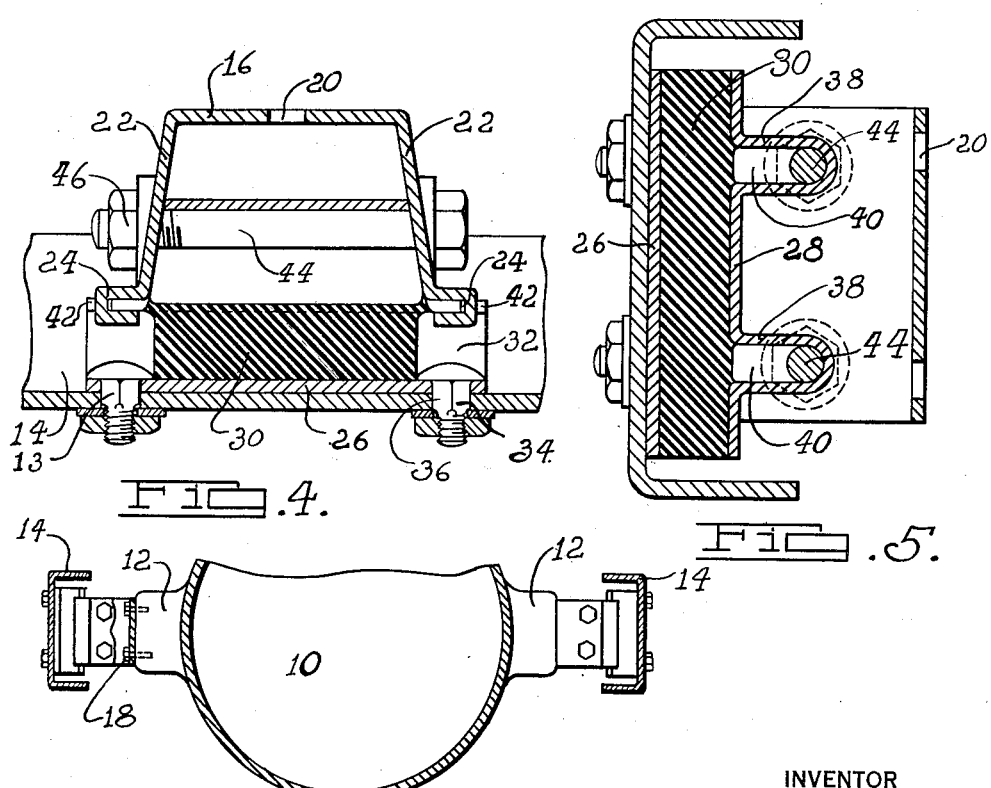
INVENTOR
ROGER K. LEE.
BY
ATTORNEY Patented Aug. 23, 1932

1,872,766

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

MOTOR MOUNTING

Application filed February 24, 1930. Serial No. 430,633.

This invention relates to a resilient mounting and more particularly to a mounting adapted to dampen out vibrations between a support and a supporting member such as an internal combustion engine mounted in the side frame members of a vehicle chassis.

An important object of the invention is to provide an inexpensive mounting, preferably of elastic material, which may be easily assembled or disassembled, between an engine and a channel side frame member.

Another object of the invention is to provide a channel shaped member, detachably secured to the engine, which has a gripping engagement with the lateral edges of a member resiliently supported on the side frame member.

Other objects and advantages of the invention will more fully appear from the following description taken in connection with the accompanying drawing, in which:

Fig. 1 is a sectional view showing a portion of an internal combustion engine supported between the side members of a chassis frame illustrating a preferred embodiment of my invention.

Fig. 2 is a side elevation showing an enlarged view of the mounting secured to the side frame member.

Fig. 3 is a side elevation of the mounting shown in Fig. 2, the side frame member being shown in section.

Fig. 4 is a sectional view taken on line 4—4 of Fig. 2.

Fig. 5 is a sectional view taken on line 5—5 of Fig. 2.

Referring to the drawing, I have shown an internal combustion engine 10 having laterally projecting arms 12. Side frame members 14 have been illustrated as the frame members of an automobile chassis adapted to form a support for the engine 10. A channel shaped member 16 is detachably secured to the arm 12 by bolts 18, the central portion of the channel being provided with openings 20 for the reception of the bolts 18. The side flanges 22 of the channel shaped member 16 have their outer edges bent outwardly and then inwardly, the inwardly extending portion bent back over the outwardly extending portion, to provide a grooved portion 24 which embraces the opposite edges of a member to which the channel 16 is attached.

The mounting which forms a resilient connection between the channel 16 and the side frame member has a metallic plate like member 26, preferably rectangular in shape. Spaced from the plate like member 26 is another member 28 which has a face in overlapping relation with a face of the plate 26. These two plates are joined together by resilient material 30, such as rubber, vulcanized to the adjacent faces of each member. Openings 32 are provided in the rubber member 30 to permit the insertion of bolts 34 through aligned openings 36 in the plate like member 26 and the side frame member 14. If desired the plate 26 may be provided with flanges to receive the bolts and the openings 32 may be omitted.

The member 28 is preferably a stamping and has U shaped portions 38 formed therein extending away from the resilient member 30. The rubber is vulcanized to the ends and central portion of the inner face of the member 28, bridging the space between the flanges of the U shaped members 38, thus providing an opening 40 in the member 28.

The grooved ends of the flanges 22, above referred to, receive the opposite edges of the member 28. Outwardly extending flanges 42 hold the flanges 22 against vertical movement relative to the member 28. Bolts 44 extending through openings in the side flanges 22 also extend through the openings 40 in the U shaped members 38 and a nut 46 screw threaded on the bolt 44 tightly draws the side flanges 22 together, clamping the member 28 therebetween. The U shaped members 38 extend substantially the full width of the member 28 and have their opposite ends in engagement with the inner faces of the side flanges 22 so that the side flanges 22 clamp the member 28 by its side edges and the ends of the U shaped members 38.

By such a construction it will be apparent that the member 28 is supported vertically by a gripping action on its edges and the ends of the U shaped members 38 as well as by the members 38 supported directly on the bolts 44 which are in turn supported on the side flanges 22.

Various changes including the size, shape and arrangement of parts may be made without departing from the spirit of my invention and it is my intention to cover by the appended claims such changes as may be reasonably included within the scope of my invention.

I claim:

1. A mounting of the class described comprising, spaced members arranged in overlapping relation with each other, a U shaped member having flanges clamped to the edges of one of said members, attaching means on the other of said members, and rubber between and bonded to the adjacent faces of said spaced members.

2. A mounting of the class described comprising, spaced members arranged in overlapping relation with each other, a U shaped member having flanges embracing opposite edges of one of said members, attaching means on the other of said members, and rubber vulcanized to the adjacent faces of said spaced members.

3. A mounting of the class described comprising, spaced members arranged in overlapping relation with each other, a channel member having beads in which the edges of one of the members are engaged, means for securing the other member to a support, means for securing the channel to a part to be supported, and rubber vulcanized to the adjacent faces of said members.

4. A mounting of the class described comprising, spaced members arranged in overlapping relation with each other, rubber vulcanized to the adjacent faces of said members, outwardly extending portions on one of said spaced members, and connecting means having lateral attaching flanges clamped to the edges of said outwardly extending portions.

5. A mounting of the class described comprising, spaced members arranged in overlapping relation with each other, rubber vulcanized to the adjacent faces of said members, outwardly extending portions on one of said spaced members, connecting means having lateral attaching flanges clamped to the edges of said outwardly extending portions, and a bolt extending through said lateral flanges and said outwardly extending portion for securing said flanges to the outwardly extending portion.

6. A mounting of the class described comprising, spaced members arranged in overlapping relation with each other, rubber vulcanized to the adjacent faces of said members, channel portions on one of said members extending from one side of said member to the other side, connecting means having lateral attaching flanges, and means for clamping said flanges to said channel portions.

7. A mounting of the class described comprising, spaced members arranged in overlapping relation with each other, rubber vulcanized to the adjacent faces of said members, channel portions on one of said members extending from one side of said member to the other side, connecting means having lateral attaching flanges, and means for clamping said flanges to the opposite edges of said member and to the ends of said channel portions.

8. A mounting of the class described comprising, spaced members arranged in overlapping relation with each other, and rubber vulcanized to the adjacent faces of said members, one of said spaced members having channel projections extending outwardly away from said rubber.

9. A mounting of the class described comprising, spaced members arranged in overlapping relation with each other, and rubber vulcanized to the adjacent faces of said members, one of said spaced members having channel projections extending outwardly away from said rubber and extending substantially the width of said member.

ROGER K. LEE.